United States Patent
Huang et al.

(10) Patent No.: US 9,588,571 B2
(45) Date of Patent: Mar. 7, 2017

(54) DYNAMIC POWER SUPPLY MANAGEMENT

(71) Applicant: Quanta Computer Inc., Taoyuan (TW)

(72) Inventors: Jen-Hsuen Huang, Taoyuan (TW); Fa-Da Lin, Taoyuan (TW); Chih-Wei Yu, Taoyuan (TW)

(73) Assignee: Quanta Computer Inc., Taoyuan (TW)

( * ) Notice: Subject to any disclaimer, the term of this patent is extended or adjusted under 35 U.S.C. 154(b) by 14 days.

(21) Appl. No.: 14/793,958

(22) Filed: Jul. 8, 2015

(65) Prior Publication Data

US 2017/0010652 A1    Jan. 12, 2017

(51) Int. Cl.
*G06F 11/00* (2006.01)
*G06F 1/32* (2006.01)
*G06F 11/07* (2006.01)

(52) U.S. Cl.
CPC ........ *G06F 1/3234* (2013.01); *G06F 11/0706* (2013.01); *G06F 11/0751* (2013.01); *G06F 11/0793* (2013.01)

(58) Field of Classification Search
USPC .......................................................... 714/14
See application file for complete search history.

(56) References Cited

U.S. PATENT DOCUMENTS

2011/0302435 A1   12/2011  Fang
2013/0212279 A1*   8/2013  Dutta .................... G06F 9/5077
                                                  709/226
2013/0318371 A1*  11/2013  Hormuth .................. G06F 1/28
                                                  713/320
2014/0233173 A1*   8/2014  Matsushita ........ H05K 7/20836
                                                  361/679.46

FOREIGN PATENT DOCUMENTS

TW         201500902 A      1/2015

OTHER PUBLICATIONS

Taiwanese Office Action No. 10521266490 dated Oct. 21, 2016 w/ First Office Action Summary.

* cited by examiner

*Primary Examiner* — Sarai Butler
(74) *Attorney, Agent, or Firm* — Nixon Peabody LLP

(57) ABSTRACT

In some implementations, a rack management controller can dynamically manage power supply units in a server rack system. For example, the rack management controller can determine how many power supply units should be powered on based on the power requirements of the server rack system. The management controller can configure a power management controller to turn on the determined number of power supply units. The rack management controller can receive status signals from the power supply units in the server rack. The rack management controller can detect when a power supply unit fails based on the status signals. The rack management controller can dynamically reconfigure the power management controller to replace the failed power supply unit by turning on a reserved power supply unit.

21 Claims, 5 Drawing Sheets

DYNAMIC POWER SUPPLY MANAGEMENT

TECHNICAL FIELD

The disclosure generally relates to managing power supplies in a server rack system.

BACKGROUND

The power needed to run servers and other components in a server rack system is provided by power supply units. As the number of servers (e.g., nodes) in the rack increases, the electricity required to power the servers increase. As the power requirements of the servers increase, more power supply units are needed to supply the power requirements of the servers. Typically, a rack is configured with a number of power supply units necessary to satisfy the peak power requirements of the servers in the rack. Sometimes additional power supply units beyond the minimum necessary number will be included in the rack system to handle power supply unit failures (e.g., provide a redundant power supply unit). By providing excess power capacity (e.g., beyond the minimum required for the rack system), the servers in the rack can continue to operate even if one of the power supply units fails. However, running, for example, six (6) power supply units in a rack, when only four (4) are required wastes energy and unnecessarily wears out the extra power supply units.

SUMMARY

In some implementations, a rack management controller can dynamically manage power supply units in a server rack system. For example, the rack management controller can determine how many power supply units should be powered on based on the power requirements of the server rack system. The rack management controller can configure a power management controller to turn on the determined number of power supply units. The rack management controller can receive status signals from the power supply units in the server rack. The rack management controller can detect when a power supply unit fails based on the status signals. The rack management controller can dynamically reconfigure the power management controller to replace the failed power supply unit by turning on a reserved power supply unit.

If there are not enough operational power supply units to support the power requirements of the servers in the rack, the rack management controller can cause the server processors to operate at lower speeds thereby reducing the power requirement of the servers in the rack system to a level that can be supported by the remaining power supply units. The rack management controller can notify a system administrator device to prompt the system administrator to replace the failed power supply units.

Particular implementations provide at least the following advantages: A server rack system can be configured with enough power supply units to power supply unit failures while reducing the energy usage associated with backup power supply units. Backup power supply units can be turned off and later powered on as needed thereby reducing the wear on the backup power supply units.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
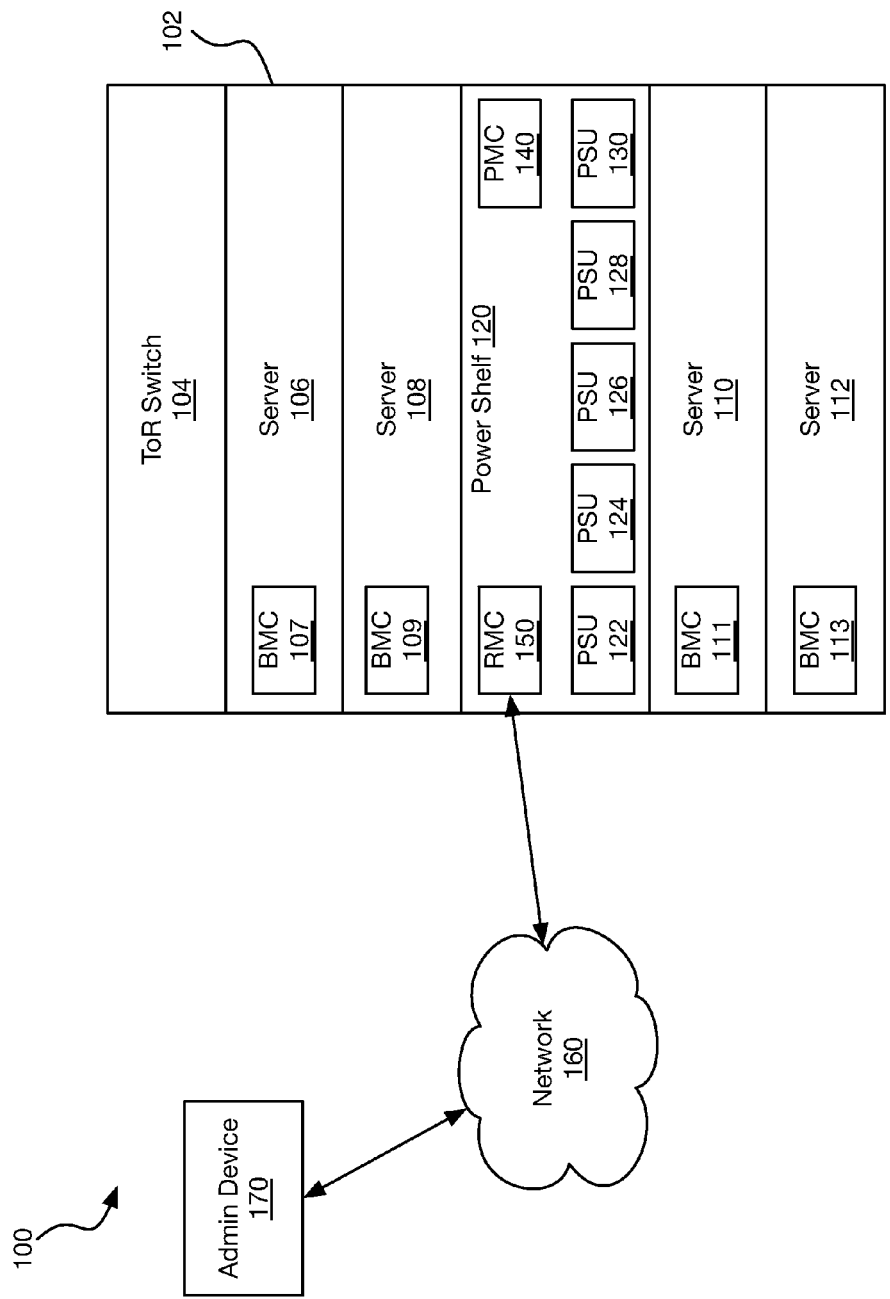
FIG. 1 is a block diagram of an example system for dynamic power supply management.

FIG. 1 is a block diagram of an example system 100 for dynamic power supply management. System 100 can include a server rack 102. Server rack 102 can include top of rack switch 104 for routing/forwarding communications between servers 106, 108, 110 and 112 and various client devices (not shown). Each server 106, 108, 110 and 112 can be a managed server device that includes baseboard management controller (BMC) 107, 109, 111 and 113, respectively. For example, a baseboard management controller is a processor configured to provide out-of-band management/administration of servers and other computing devices. The baseboard management controller can operate independently of the central processing unit and/or operating system of a computing device.

Server rack 102 can include power shelf 120. For example, power shelf 120 can include ports, connectors, etc., for connecting each power supply unit (PSU) 122, 124, 126, 128 and 130 to server rack 102. Power supply units 122, 124, 126, 128 and 130 can receive electricity from an external power source (e.g., wall outlet, municipal power source, generator power, etc.) and supply the external power to internal components (e.g., servers, controllers, network interface cards, etc.) of server rack 102.

Server rack 102 can include power management controller (PMC) 140 for managing PSUs 122, 124, 126, 128 and 130. For example, PMC 140 can be a processor (e.g., circuit, microprocessor, etc.) configured to control power supply units 122, 124, 126, 128 and 130. PMC 140 can receive status signals from each PSU 122, 124, 126, 128 and/or 130 to determine the health (e.g., operational, failed, output, etc.) of each PSU. PMC 140 can turn on and/or off each PSU 122, 124, 126, 128 and 130. For example, PMC 140 can receive PSU configuration information from rack management controller (RMC) 150 that indicates which PSU to turn on and/or which PSU to turn off. PMC 140 can then power on or power off the PSUs based on the received PSU configuration information. Alternatively, the PMC 140 can decide which of the PSUs to turn on.

Server rack 102 can include RMC 150. For example, RMC 150 can be a processor configured for managing the computing components (e.g., servers, switches, fans, etc.) in server rack 102. RMC 150 can be configured with an operating system and/or other computer-readable instructions for performing dynamic power supply management, as described herein. RMC 150 can determine the power requirements of server rack 102. For example, RMC 150 can obtain rack configuration information that indicates the power requirements of the rack and/or servers in the rack from admin device 170 (e.g., laptop computer, tablet computer, smartphone, etc.) through network 160 (e.g., local area network, wide area network, the Internet, etc.). RMC 150 can dynamically determine the power requirements of server rack 102 by monitoring power usage of each server in server rack 102. For example, each BMC 107, 109, 111, and/or 113 can be configured to monitor the power usage of respective servers 106, 108, 110, and/or 112. RMC 150 can request power usage metrics from each BMC 107, 109, 111, and/or 113. RMC 150 can receive the power usage metrics from each BMC 107, 109, 111, and/or 113 and calculate (e.g., estimate) the power usage requirements for server rack 102.

In some implementations, RMC 150 can determine how many power supply units to turn on based on the power usage requirements for server rack 102. For example, each PSU 122, 124, 126, 128 and/or 130 can be configured to supply a certain amount of power (e.g., 300 Watts, 500 Watts, etc.). As described above, RMC 150 can determine the power consumption for server rack 102. For example, the power consumption (e.g., average, maximum, peak, etc.) for server rack 102 can be calculated at 800 Watts. If each PSU 122, 124, 126, 128 and/or 130 is rated at 500 Watts, then two (2) power supply units are required to power server rack 102. To provide protection against PSU failure, the power supply units can be configured in an N+1 configuration. For example, N can be the number of required PSUs to meet the power requirements of server rack 102. Once (1) additional PSU can be provided to mitigate failure of one of the PSUs. Thus, RMC 150 can determine that three (3) PSUs should be powered on for server rack 102.

Once RMC 150 determines that a 2+1 configuration is required to supply power to server rack 102, RMC 150 can send PSU configuration information (e.g., including identifiers for the PSUs to turn on) to PMC 140 specifying which PSUs should be turned on. PMC 140 can then turn on the PSUs specified in the configuration information received from RMC 150. Alternatively, the PMC 140 can decide which of the PSUs to turn on. For example, if RMC 150 specifies that PSU 122, 124 and 126 should be turned on, them PMC 140 can turn on PSU 122, 124 and 126 and leave PSU 128 and PSU 130 in a low power or powered off state. Thus, the PSUs necessary to power the server rack (e.g., 2) and provide for failure mitigation (e.g., +1) may be turned on while the remaining PSUs can be turned off.

Figure 2:
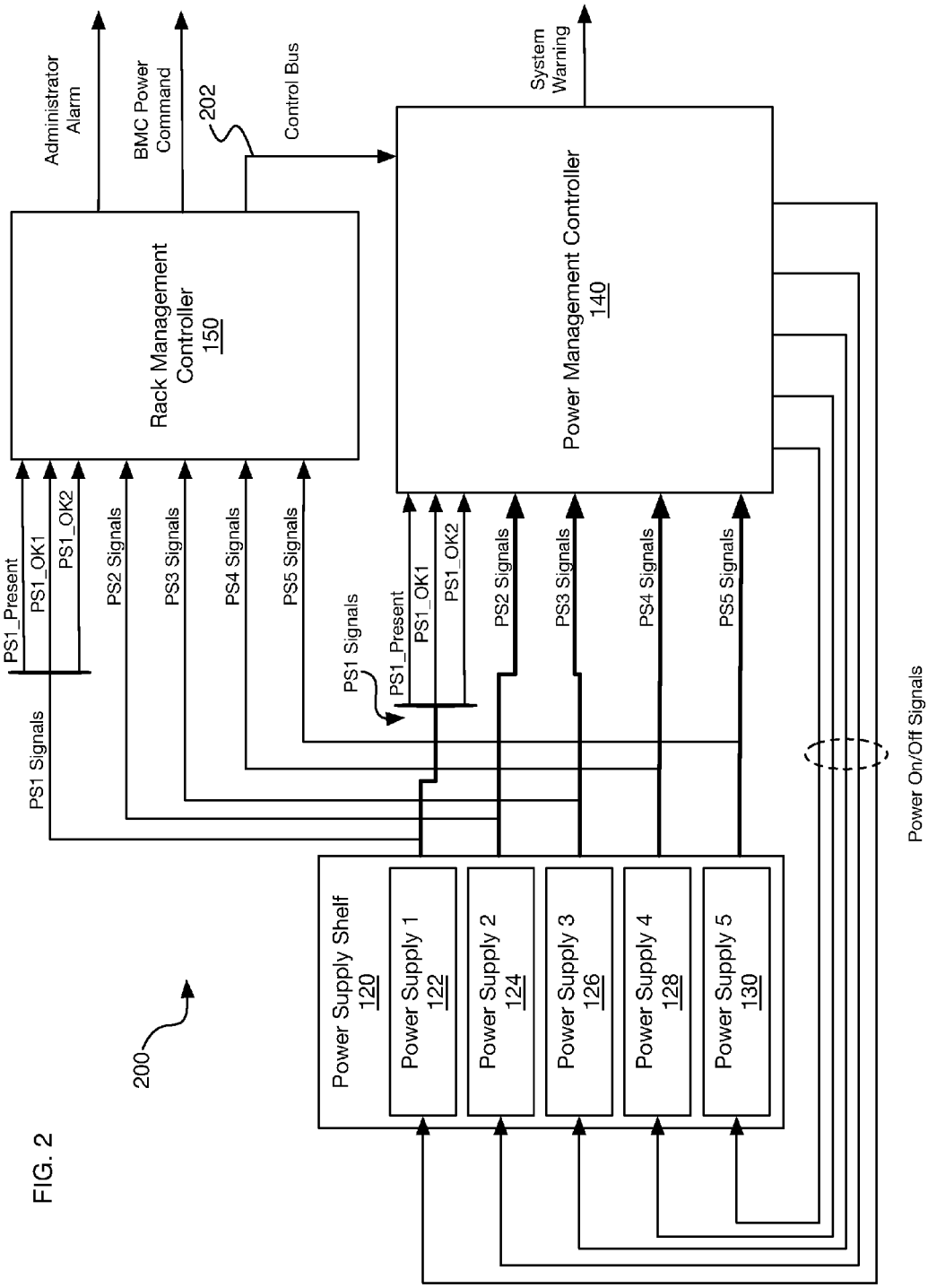
FIG. 2 is a block diagram of an example system for dynamically managing power supply units based on power supply unit status information.

FIG. 2 is a block diagram of an example system 200 for dynamically managing power supply units based on power supply unit status information. System 200 can correspond to system 100 described above. For example, system 200 illustrates the interactions and operations of various components of server rack 102. In a specific example, rack management controller (RMC) 150 can receive status signals from power supply units (PSU) 122, 124, 126, 128 and/or 130 and adjust the power supply unit settings in power management controller (PMC) 140 based on the status signals.

In some implementations, system 200 can include power supply shelf 120. Power supply shelf 120 can be a component of server rack 102 that is configured to receive PSUs 122, 124, 126, 128 and/or 130. Once a power supply unit (e.g., PSU 122) is plugged into (e.g., inserted into, coupled to, etc.) power supply shelf 120, the power supply unit can send signals (e.g., PS1 signals) to PMC 140 to notify PMC 140 of the status of the power supply unit. For example, PSU 122 can send PS1 signals to PMC 140. PS1 signals can include a present signal (e.g., PS1_Present) indicating that PSU 122 is coupled to power supply shelf 120. PS1 signals can include a first OK signal (e.g., PS1_OK1) indicating the status of a first component or operation of PSU 122. For example, the first OK signal can indicate that PSU 122 is receiving sufficient power from an external power source. PSU1 signals can include a second OK signal (e.g., PS1_OK1) indicating the status of a second component or operation of PSU 122. For example, the second OK signal can indicate that PSU 122 is producing or outputting sufficient power from to the system 200 (e.g., server rack 102). While the above description describes the signals sent from PSU 122 to PMC 140, each power supply unit (e.g., PSU 124, 126, 128, 130) can send similar signals to PMC 140. For example, PSU 126 (e.g., power supply 3) can send present (e.g., PS3_Present) and OK signals (e.g., PS3_OK1, PS3_OK2) to PMC 140 to indicate the status or state of PSU 126 in a similar manner as PSU 122, described above.

In some implementations, power management controller 140 can send a power on signal or power off signal to each power supply unit based on the status signals received from each power supply unit. For example, if PMC 140 receives a PS4_Present signal from PSU 128, then PMC 140 can send a power on signal to PSU 128 to turn on PSU 128. Upon powering on, PSU 128 can send PS4_OK1 and PS4_OK2 signals to PMC 140 to indicate that PSU 128 is operating properly. For example, the PS4_OK1 and PS4_OK2 signals can transmit a value (or voltage) that indicates that the status of PSU 128 is good. If PSU 128 sends PS4_OK1 and PS4_OK2 signals to PMC 140 indicating that PSU 128 is not operating properly (e.g, PS4_OK1 and/or PS4_OK2 values indicate a failure), then PMC 140 can send a signal to PSU 128 to power off PSU 128 to prevent damage to PSU 128 or damage to system 200 (e.g., server rack 102). For example, PMC 140 can store the status (e.g., healthy, failure) of each power supply unit so that PMC 140 does not attempt to turn on a failed power supply unit in the future.

In some implementations, power management controller 140 can detect that a power supply unit has been replaced. For example, PSU 128 can send a PS4_Present signal to PMC 140 when it is coupled to power supply shelf 120. PMC 140 can monitor the PS4_Present signal while PMC 140 monitors the health (e.g., healthy, failure) of PSU 128. If PMC 140 detects that it is no longer receiving the PS4_Present signal from PSU 128, PMC 140 can determine that PSU 128 has been disconnected from power supply shelf 120. When a new PSU 128 is coupled to power supply shelf 120, PMC 140 can determine that the failed PSU 128 has been replaced, power on the new PSU 128, and monitor the PS4_Present, PS4_OK1 and PS4_OK2 signals to determine the health (e.g., status) of new PSU 128.

In some implementations, power management controller 140 can turn on power supply units according to configuration data received from rack management controller 150. For example, rack management controller 150 can receive status signals from the power supply units coupled to power supply shelf 120. The status signals can be the same status signals generated by the power supply units (e.g., PSU 122, 124, 126, 128 and/or 130) and sent to PMC 140, as described above. For example, each PSU can generate PRESENT, OK1, and OK2 signals and transmit the signals to RMC 150. RMC 150 can receive the signals, determine the health of each power supply unit and dynamically adjust the configuration of the power supply units in system 200. For example, if, as described above, RMC 150 determines that a 2+1 power supply unit configuration is required to power server rack 120, then RMC 150 can send PSU configuration data to PMC 140 over control bus 202 indicating that PSU 122, 124 and 126 should be turned on. In response to receiving the PSU configuration data, PMC 140 can send power on signals to PSU 122, 124 and 126 and power off signals to PSU 128 and 120, if needed.

In some implementations, RMC 150 can dynamically adjust the PSU configuration in system 200. For example, RMC 150 can detect the failure of PSU 122 and send updated configuration data to PMC 140. For example, if RMC 150 receives PS1_OK1 and/or PS1_OK2 signals that indicate that PSU 122 has failed, then RMC 150 can send PSU configuration data to PMC 140 indicating that PSU 124, 126 and 128 should be powered on, PSU 130 should be powered off, and PSU 122 has failed. Thus, RMC 150 can maintain the 2+1 PSU configuration for powering system 200. In some implementations, when a power supply unit (e.g., PSU 122) has failed, RMC 150 can send an alarm to administrator device 170 to notify the system administrator that one of the PSUs has failed and needs to be replaced. For example, RMC 150 can send the alarm to administrator device 170 periodically until the failed PSU has been replaced.

In some implementations, RMC 150 can dynamically adjust the PSU configuration in system 200, particularly in a situation where multiple PSUs have failed. For example, RMC 150 can detect the failure of PSU 122 and PSU 124. It should be understood that the RMC can detect the failure of any or all PSUs, the previous example is not limiting. For example, if RMC 150 receives PS1_OK1 and/or PS1_OK2 signals that indicate that PSU 122 and PSU 124 have failed, then RMC 150 can send PSU configuration data to PMC 140 indicating that PSU 126, PSU 128, and PSU 130 should be powered on, and PSU 122 and PSU 124 have failed. Thus, RMC 150 can maintain the 2+1 PSU configuration for powering system 200. In some implementations, when power supply units (e.g., PSU 122 and PSU 14) have failed, RMC 150 can send an alarm to administrator device 170 to notify the system administrator that the PSUs have failed and need to be replaced. For example, RMC 150 can send the alarm to administrator device 170 periodically until the failed PSUs have been replaced.

In some implementations, RMC 150 can dynamically adjust the PSU configuration in system 200 based on detecting an increase in power usage of system 200. For example, RMC 150 can detect additional servers or components in system 200 (e.g., server rack 102). RMC 150 can determine that the additional servers and/or components require more power. Based on the increased power requirements of system 200, RMC 150 can determine that a 3+1 PSU configuration is required to power system 200 and provide for failure mitigation. Based on the determination, RMC 150 can send PSU configuration data to PMC 140 indicating that PSU 124, 126, 128 and 130 should be powered on and, since PSU 122 previously failed, PSU 122 should remain in the powered off failure state. In response to receiving the PSU configuration data from RMC 150, PMC 140 can turn on PSU 124, 126, 128 and 130.

In some implementations, RMC 150 can send a critical alarm to administrator device 170 when a PSU failure is detected. Continuing the example above, if RMC 150 has configured PMC 140 with a 3+1 configuration, and PSU 122 has already failed and has not been replaced, then system 200 is using all four of the healthy PSUs and has no PSUs available in reserve. If RMC 150 detects that PSU 124 has failed (e.g., PS2 signals indicate a failure), then RMC 150 can send a critical alarm to administrator device 170 indicating that system 200 no longer has the ability to mitigate further PSU failures. For example, since system 200 requires a minimum of three (3) PSUs to operate and the system only has three operational PSUs left (e.g., PSU 126, 128 and 130), system 200 does not have the extra (e.g., +1) PSU powered on to mitigate failure of one of the three remaining PSUs. Thus, an additional failure (e.g., reducing the number of operational PSUs to two) will cause a degradation of the performance of system 200 since system 200 requires three PSUs to operate at full performance.

In some implementations, RMC 150 can dynamically adjust the power usage of system 200 based on detecting a PSU failure. Continuing the example above where only three PSUs are operational and system 200 requires three PSUs to operate at full performance, if RMC 150 detects a failure of PSU 126, RMC 150 can send PSU configuration data to RMC 150 indicating that system 200 is in a 3+1 configuration, that PSU 128 and 130 are operational, and that PSU 122, 124 and 126 have failed. In response to detecting the failure, RMC 150 can determine that there are not enough power supply units to power system 200 (e.g., three PSUs are required, only two PSUs are operational). In response to determining that there are not enough power supply units available to power system 200, RMC 150 can command the servers in server rack 102 to reduce their power consumption. Alternatively, various components in server rack 102 can also command the servers to reduce their power consumption. For example, RMC 150 can send a command to BMC 107, 109, 111, and 113 to lower the operating speed of the central processing units of each server 106, 108, 110, and 112, in server rack 102 thereby reducing the power consumption of each server to a level that can be supported by the remaining two power supply units (e.g., PSU 128 and PSU 130).

In some implementations, PMC 140 can send a power supply warning to system 200. For example, in response to detecting the failure of a PSU that drops the number of PSUs below the minimum threshold number of PSUs required to power system 200, PMC 140 can send a warning to system 200 indicating that system 200 should reduce its power consumption to a level supportable by the two remaining PSUs 128 and 130. For example, PMC 140 can send the warning to RMC 150 and RMC 150 can send commands to the BMCs of servers in server rack 102 to cause the servers to reduce their power consumption. Alternatively, PMC 140 can send the warning to each of the servers to reduce their power consumption.

Thus, system 200 can dynamically manage the power supply units of system 200 to accommodate the varying power requirements and power supply conditions within system 200.

In some implementations, each of the status signals can be delivered on a different circuit, conductive track, or wire. Thus, the block diagram of FIG. 2 can illustrate hardware circuits for connecting power supply shelf 120 to power management controller 140 and rack management controller 150. For example, power supply shelf can include output pins for sending PS1_Present, PS1_OK1 and PS1_OK2 signals. RMC 150 and PMC 140 can include input pins for receiving PS1_Present, PS1_OK1 and PS1_OK2 signals. The output pins and input pins can connect to circuits or tracks in a circuit board that allow for transmission of the signals from the power supply units to RMC 150 and PMC 140.

Figure 3:
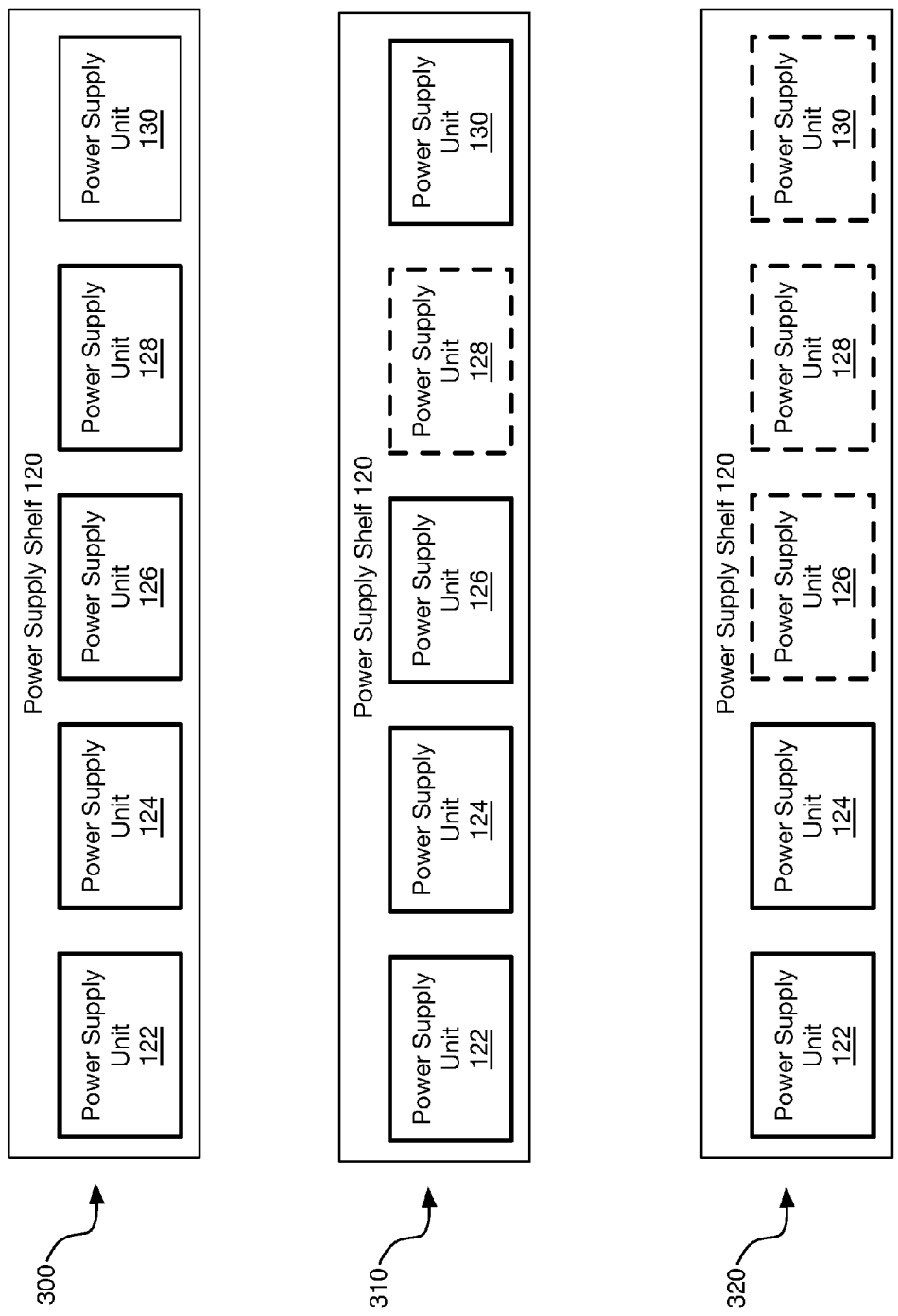
FIG. 3 is a block diagram illustrating example power supply states.

FIG. 3 is a block diagram illustrating example power supply states 300, 310 and 320. For example, power supply state 300 illustrates a 3+1 power supply unit configuration. In power supply state 300, PSU 122, 124 and 126 provide the minimum power requirements for powering server rack 120 and PSU 128 provides the additional (e.g., +1) PSU for PSU failure mitigation. Thus, one of PSU 122, 124, 126 and/or 128 can fail, and the remaining three can still provide sufficient power to run server rack 102 at full performance. In power supply state 300, PSU 130 is turned off thereby reducing the wear on and energy usage of PSU 130.

In power supply state 310, PSU 122, 124, 126 and 130 are powered on to maintain the 3+1 configuration. PSU 128 has failed and is powered off. For example, RMC 150 has detected the failure of PSU 128 and has sent a command to PMC 140 to turn off PSU 128 and to turn on PSU 130.

In power supply state 320, PSU 122 and 124 are powered on. PSUs 126, 128 and 130 have failed and are powered off. Since server rack 102 is in a 3+1 configuration (e.g., a minimum of 3 PSUs are required to provide the power requirements of server rack 102) and only 2 PSUs are healthy, RMC 150 can send a command to each server (e.g., each server's BMC) in server rack 102 to reduce the power consumption of each server to a level such that the remaining two power supply units (e.g., PSU 122 and 124) can power server rack 102. For example, if PSU 122 and 124 can provide a total power output of 1000 Watts, then RMC 150 can send a command that reduces the power consumption of each of the four servers in server rack 102 to below 250 Watts. For example, each BMC can adjust the central processing unit (CPU) settings (e.g., operating frequency settings) of their respective servers so that each CPU consumes less than 200 Watts. If the CPU for a server cannot operate at the reduced power consumption level, then the BMC can shut down the server to prevent damage to the server or to the power supply units.

Figure 4:
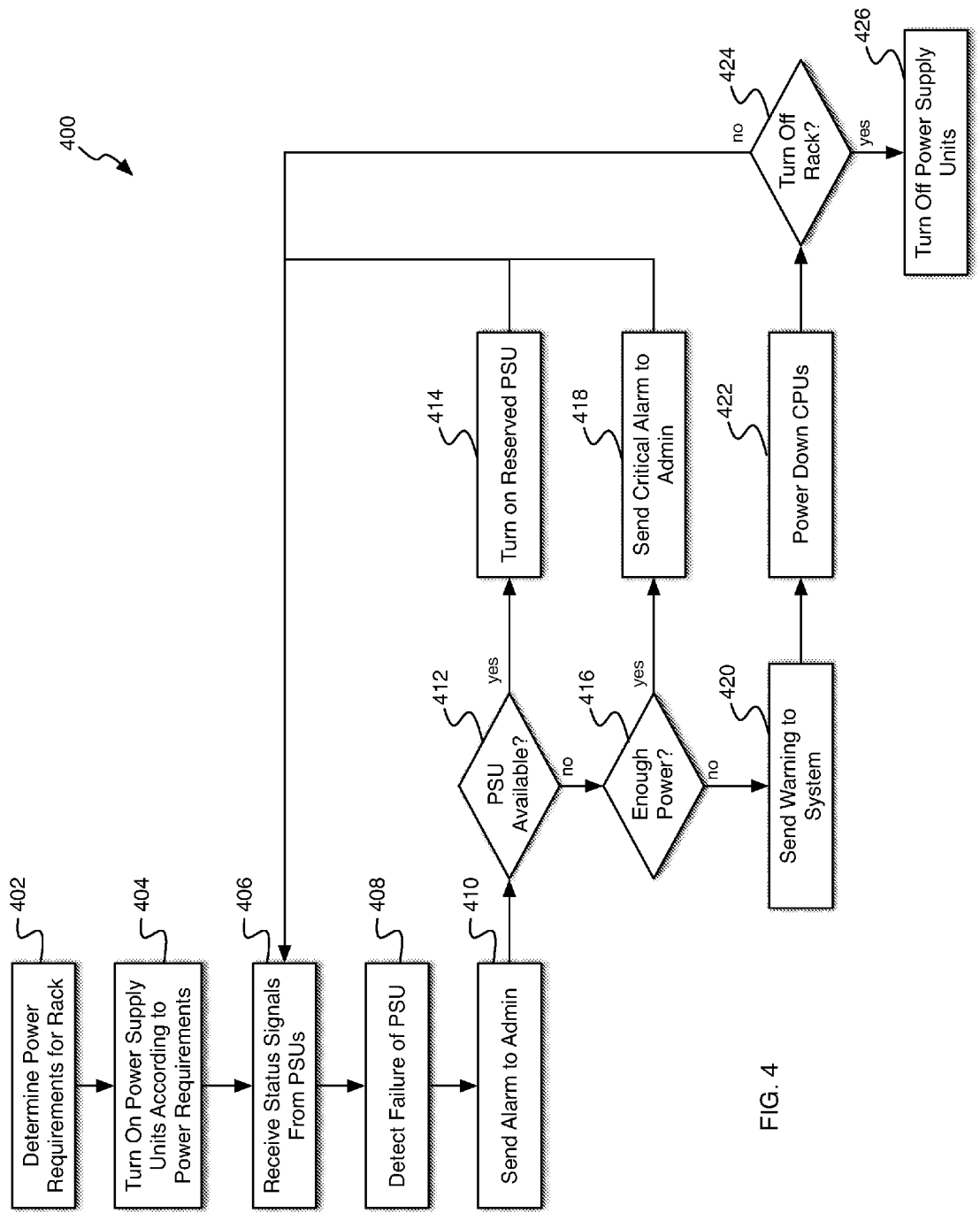
FIG. 4 is a flow diagram of an example process for dynamically managing power supply units in a server rack system.

FIG. 4 is a flow diagram of an example process 400 for dynamically managing power supply units in a server rack system. At step 402, a system controller can determine the power requirements for a server rack system. For example, rack management controller 150 can determine the power requirements for server rack 102. Rack management controller (RMC) 150 can communicate with baseboard management controllers (BMC) for each server in server rack 102 to determine the configuration of each server and power requirements of each server. For example, the power requirements can be determined by the BMC empirically by monitoring power usage over time. The BMC can be preconfigured with stored power requirements as determined by an administrator-user. RMC 150 can be configured with power requirements for the rack configuration, for example. For example, RMC 150 can determine that server rack 102 requires 1000 Watts to power the servers in server rack 102.

At step 404, the system controller can turn on power supply units for the server rack system according to the power requirements for the server rack system. For example, RMC 150 can request power output information from each power supply unit coupled to the power supply shelf of server rack 102. RMC 150 can determine that server rack 102 is configured with six (6) power supply units and each power supply unit is capable of delivering 400 Watts to the servers in server rack 102. RMC 150 can determine that three of the six power supply units need to be turned on to deliver the 1000 Watts of power needed by server rack 102 (e.g., 3×400=1200 Watts). Thus, server rack 102 requires a minimum (e.g., threshold number) of three power supply units to produce the power necessary to run the server rack at full capacity. Based on this determined minimum number of PSUs, RMC 150 can configure server rack 102 to run in a 3+1 configuration. For example, RMC 150 can send PSU configuration data to PMC 140 indicating that four PSUs should be turned on (e.g., minimum of 3 PSUs+1 PSU for failure mitigation. PMC 140 can then send a power on signal to the four PSUs specified by the PSU configuration data, as described above.

At step 406, the system controller can receive status signals from power supply units. For example, RMC 150 and PMC 140 can receive status signals from each power supply unit coupled to the power supply shelf of server rack 102. Each power supply unit can send PRESENT, OK1 and OK2 signals to RMC 150 and/or PMC 140, as described above.

At step 408, the system controller can detect a failure of a power supply unit. For example, RMC 150 can determine that one of the powered on PSUs has failed when RMC 150 receives an OK1 and/or OK2 signal that indicates that the PSU is not operating normally.

At step 410, the system controller can send an alarm to an administrative device. For example, RMC 150 can send an alarm to administrative device 170 to notify the administrator-user that a power supply unit has failed and needs to be replaced.

At step 412, the system controller can determine whether another power supply unit is available to be turned on. For example, with six PSUs configured in the power shelf of server rack 102 and a 3+1 configuration specified by RMC 150, RMC 150 can determine that there are two powered off PSUs held in reserve in server rack 102. Thus, in this example, RMC 150 can determine that another PSU is available to be turned on to replace the failed PSU.

At step 414, the system controller can turn on one of the reserved power supply units. For example, since RMC 150 determined that there is a reserved PSU available, RMC 150 can send configuration data to PMC 140 to cause PMC 140 to turn on one of the reserved PSUs, as described above. Thus, at the end of step 414, there are four operational powered on PSUs (e.g., 3+1), one PSU powered off in reserve, and one failed PSU.

After step 414, process 400 can return to step 406, where the system controller can receive status signals from the operational powered PSUs. For example, RMC 150 can monitor the health of the powered on PSUs by monitoring the signals received from each PSU.

If at step 412, the system controller determines that there are no reserved unpowered PSUs available, the system controller can determine whether the available healthy powered PSUs can produce enough power to run server rack 102. For example, if RMC 150 previously determined that a minimum of three PSUs are required to run server rack 102 and there are three operational healthy PSUs left, then RMC can determine that there is enough power to run server rack 102.

At step 418, the system controller can send a critical alarm to the administrative device. For example, RMC 150 can determine that there are enough operational PSUs (e.g., 3) to run server rack 102 but no PSUs left to mitigate another PSU failure (e.g., no +1). RMC 150 can send a critical alarm to the administrative device to notify the administrator-user that another PSU failed and that another PSU failure will cause the server rack system to degrade in performance. The critical alarm can be sent periodically to remind the administrator-user to replace the failed power supply units.

After step 418, process 400 can return to step 406, where the system controller can receive status signals from the operational powered PSUs. For example, RMC 150 can monitor the health of the powered on PSUs by monitoring the signals received from each PSU 406 and detect a PSU failure 408.

If at step 416, the system controller determines that the remaining healthy operational PSUs cannot provide enough power for server rack 102, then at step 420 the system controller can send a warning to the server rack system. For example, if RMC 150 determined that three PSUs are required to power server rack 102 and after a PSU failure there are only two healthy operational PSUs left, then at step 420 RMC 150 can send a warning message to server rack 102. For example, the warning message can be a command to the server rack system to power down server CPUs to reduce power consumption. For example, RMC 150 can send a command to the BMCs corresponding to each server in server rack 102 to cause the BMCs to reduce the power consumption of their respective servers.

At step 422, the system controller can power down server central processing units. For example, when the BMCs receive the command sent from RMC 150 at step 420, the BMCs can cause the CPUs of each server to reduce the frequency at which the CPUs operate thereby reducing the amount of power each server consumes.

At step 424, the system controller can determine whether to turn of the server rack system. For example, if the servers in server rack 102 can still operate with the reduced available power, then process 400 can return to step 406. However, if the power provided by the remaining PSUs drops below a critical power level, then RMC 150 can determine that server rack 102 should be powered down and can turn off the power supply units at step 426. For example, RMC 150 can send PSU configuration data to PMC 140 indicating that zero PSUs should be turned on. Upon receiving the PSU configuration data PMC 140 can send power off signals to all of the PSUs to cause the PSUs to turn off.

Example System Architecture

Figure 5:
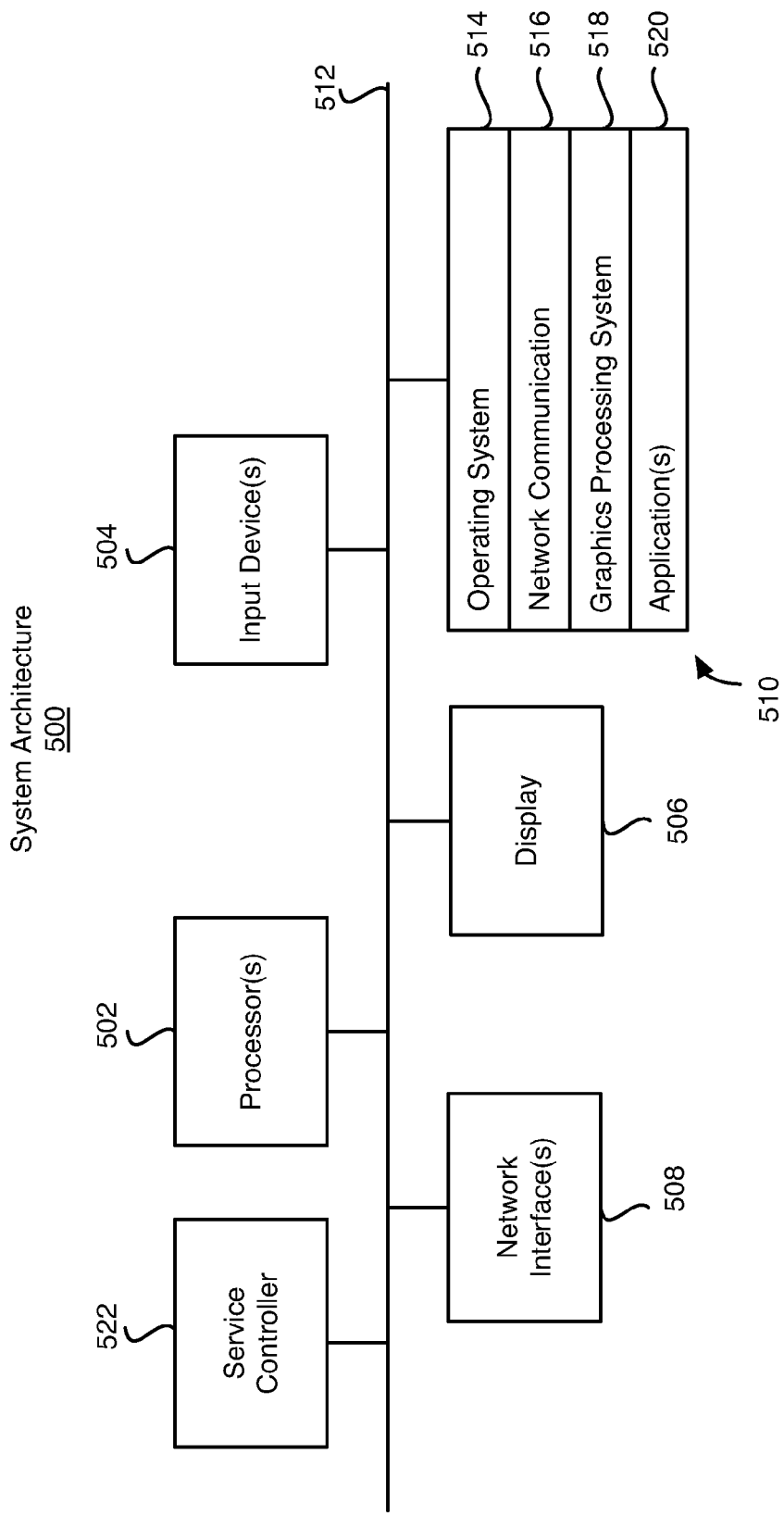
FIG. 5 is a block diagram of an example system architecture implementing the features and processes of FIGS. 1-4.

FIG. 5 is a block diagram of an example system architecture 500 implementing the features and processes of FIGS. 1-4. The architecture 500 can be implemented on any electronic device that runs software applications derived from compiled instructions, including without limitation personal computers, servers, smart phones, media players, electronic tablets, game consoles, email devices, etc. In some implementations, the architecture 500 can include one or more processors 502, one or more input devices 504, one or more display devices 506, one or more network interfaces 508 and one or more computer-readable mediums 510. Each of these components can be coupled by bus 512.

Display device 506 can be any known display technology, including but not limited to display devices using Liquid Crystal Display (LCD) or Light Emitting Diode (LED) technology. Processor(s) 502 can use any known processor technology, including but are not limited to graphics processors and multi-core processors. Input device 504 can be any known input device technology, including but not limited to a keyboard (including a virtual keyboard), mouse, track ball, and touch-sensitive pad or display. Bus 512 can be any known internal or external bus technology, including but not limited to ISA, EISA, PCI, PCI Express, NuBus, USB, Serial ATA or FireWire.

Computer-readable medium 510 can be any medium that participates in providing instructions to processor(s) 502 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 510 can include various instructions 514 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 504; sending output to display device 506; keeping track of files and directories on computer-readable medium 510; controlling peripheral devices (e.g., disk drives, printers, etc.) which can be controlled directly or through an I/O controller; and managing traffic on bus 512. Network communications instructions 516 can establish and maintain network connections (e.g., software for implementing communication protocols, such as TCP/IP, HTTP, Ethernet, etc.).

A graphics processing system 518 can include instructions that provide graphics and image processing capabilities. Application(s) 520 can be an application that uses or implements the processes described in reference to FIGS. 1-4. The processes can also be implemented in operating system 514.

Service controller 522 can be a controller that operates independently of processor(s) 522 and/or operating system 514. In some implementations, service controller 522 can be powered and operational before processor(s) 502 are powered on and operating system 514 is loaded into processor(s) 502. For example, service controller 522 can provide for pre-OS management of the computing device through a dedicated network interface or other input device. For example, system controller 522 can be a baseboard management controller (BMC) that monitors device sensors (e.g., voltages, temperature, fans, etc.), logs events for failure analysis, provides LED guided diagnostics, performs power management, and/or provides remote management capabilities through an intelligent platform management interface (IPMI), keyboard, video, and mouse (KVM) redirection, serial over LAN (SOL), and/or other interfaces. Service controller 522 can be implement the processes described with reference to FIGS. 1-4 above. For example, service controller 522 can be configured to manage power supply units coupled to server rack 102.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   determining, by a controller in a server rack system, a minimum amount of power for operating the server rack system;
   determining, by the controller, a total number of power supply units coupled to the server rack system;
   calculating a minimum threshold number of power supply units capable of providing the minimum amount of power;
   determining a power supply unit configuration based on the threshold number; and
   sending the power supply unit configuration to a power management controller, wherein the power management controller determines which power supply units to turn on based on the power supply unit configuration.

2. The method of claim 1, further comprising:
   receiving status signals from one or more power supply units; based on the status signals, detecting that at least one power supply unit has failed; and
   in response to detecting the failure, reconfiguring the power supply units coupled to the server rack system.

3. The method of claim 1, wherein the power supply unit configuration identifies how many power supply units to power on and how many power supply units to power off.

4. The method of claim 1, wherein the power supply unit configuration specifies that the minimum threshold number of power supply units plus one additional power supply unit should be turned on.

5. The method of claim 1, wherein the power supply unit configuration specifies which power supply units should be powered on.

6. The method of claim 1, further comprising:
   receiving status signals from one or more power supply units;
   based on the status signals, detecting that at least one power supply unit has failed; and
   in response to detecting the failure, causing at least one central processing unit (CPU) in at least one server to change the frequency at which the CPU operates.

7. The method of claim 1, further comprising:
   receiving status signals from one or more power supply units;
   based on the status signals, detecting that at least one power supply unit has failed; and
   in response to detecting the failure, sending an alarm to an administrative device indicating that the power supply unit has failed.

8. A non-transitory computer-readable medium including one or more sequences of instructions which, when executed by one or more processors, causes:

determining, by a controller in a server rack system, a minimum amount of power for operating the server rack system;

determining, by the controller, a total number of power supply units coupled to the server rack system;

calculating a minimum threshold number of power supply units capable of providing the minimum amount of power;

determining a power supply unit configuration based on the threshold number; and sending the power supply unit configuration to a power management controller, wherein the power management controller determines which power supply units to turn on based on the power supply unit configuration.

9. The non-transitory computer-readable medium of claim 8, wherein the instructions cause:

receiving status signals from one or more power supply units; based on the status signals, detecting that at least one power supply unit has failed; and in response to detecting the failure, reconfiguring the power supply units coupled to the server rack system.

10. The non-transitory computer-readable medium of claim 8, wherein the power supply unit configuration identifies how many power supply units to power on and how many power supply units to power off.

11. The non-transitory computer-readable medium of claim 8, wherein the power supply unit configuration specifies that the minimum threshold number of power supply units plus one additional power supply unit should be turned on.

12. The non-transitory computer-readable medium of claim 8, wherein the power supply unit configuration specifies which power supply units should be powered on.

13. The non-transitory computer-readable medium of claim 8, wherein the instructions cause:

receiving status signals from one or more power supply units; based on the status signals, detecting that at least one power supply unit has failed; and in response to detecting the failure, causing at least one central processing unit (CPU) in at least one server to change the frequency at which the CPU operates.

14. The non-transitory computer-readable medium of claim 8, wherein the instructions cause:

receiving status signals from one or more power supply units; based on the status signals, detecting that at least one power supply unit has failed; and in response to detecting the failure, sending an alarm to an administrative device indicating that the power supply unit has failed.

15. A system comprising:

one or more processors; and a non-transitory computer-readable medium including one or more sequences of instructions which, when executed by one or more processors, causes:

determining, by a controller in a server rack system, a minimum amount of power for operating the server rack system;

determining, by the controller, a total number of power supply units coupled to the server rack system;

calculating a minimum threshold number of power supply units capable of providing the minimum amount of power;

determining a power supply unit configuration based on the threshold number; and sending the power supply unit configuration to a power management controller, wherein the power management controller determines which power supply units to turn on based on the power supply unit configuration.

16. The system of claim 15, wherein the instructions cause:

receiving status signals from one or more power supply units; based on the status signals, detecting that at least one power supply unit has failed; and in response to detecting the failure, reconfiguring the power supply units coupled to the server rack system.

17. The system of claim 15, wherein the power supply unit configuration identifies how many power supply units to power on and how many power supply units to power off.

18. The system of claim 15, wherein the power supply unit configuration specifies that the minimum threshold number of power supply units plus one additional power supply unit should be turned on.

19. The system of claim 15, wherein the power supply unit configuration specifies which power supply units should be powered on.

20. The system of claim 15, wherein the instructions cause:

receiving status signals from one or more power supply units; based on the status signals, detecting that at least one power supply unit has failed; and in response to detecting the failure, causing at least one central processing unit (CPU) in at least one server to change the frequency at which the CPU operates.

21. The system of claim 15, wherein the instructions cause:

receiving status signals from one or more power supply units; based on the status signals, detecting that at least one power supply unit has failed; and in response to detecting the failure, sending an alarm to an administrative device indicating that the power supply unit has failed.

* * * * *